3,067,120
ADDITION AGENTS FOR IMPROVING ELECTRO-
PHORETIC DEPOSITION OF ALUMINUM FROM
ORGANIC SUSPENSIONS
Fred Pearlstein, Philadelphia, Pa., assignor to the United
States of America as represented by the Secretary of
the Army
No Drawing. Filed Sept. 2, 1960, Ser. No. 53,849
4 Claims. (Cl. 204—181)
(Granted under Title 35, U.S. Code (1952), sec. 266)

The invention described herein may be manufactured and used by or for the Government for governmental purposes without the payment to me of any royalty thereon.

This invention relates to the electrophoretic deposition of aluminum from organic solvents and more particularly concerns addition agents thereto for improving the quality of such deposits.

Electrophoretic deposits of aluminum are normally produced from non-aqueous liquids, since the formation of gaseous products from aqueous suspensions interfere with the uniform deposition of the metal. In the past, these deposits have been characterized by high porosity and mechanical weakness. Further, the deposition rates were quite low or the solvent used in suspending the aluminum flakes or finely comminuted aluminum powder were malodorous.

It is, therefore, a principal object of this invention to provide a suitable bath solution for the successful electrophoretic depositing of aluminum which overcomes, at least in part, the aforementioned physical defects.

Another object of the invention is to provide addition agents for incorporation with non-aqueous solvents wherein aluminum may be easily and rapidly electrophoretically deposited.

The exact nature of this invention as well as other objects and advantages thereof will be readily apparent from consideration of the following specification:

Briefly, the present invention is based on the discovery that by incorporating certain organic substances, as described more fully hereinafter, into a suitable non-aqueous aluminum suspension, the electrophoretic deposition of the aluminum can be materially improved as compared with heretofore used compositions.

In preparing the novel compositions embodied herein, the components thereof may be simply blended to provide a uniform suspension using agitation and/or other suitable means. In a preferred embodiment, the aluminum powder used was a flake material having a particle size less than 44 microns, and was removed of most stearic acid and other organic contamination by dispersing it in warm acetone, filtering through a Buchner funnel and repeating the process several times. The final filter cake is then dried. It is to be understood that the invention is not intended to be limited to aluminum flake material, and other finely divided aluminum may be used satisfactorily.

The organic solvents to be employed in the compositions contemplated herein are acetone, chloroform and methyl acetate. These liquids may be distilled after drying over anhydrous sodium sulfate, for example. The middle fraction of each, consisting of about one half the original charge, may then be collected and used as the suspending media.

The electrophoretic apparatus, per se, forms no part of the invention, but may suitably partake of 1/8 inch metal rods plated with about 0.002 inch of gold and conveniently spaced approximately 0.175 inch apart.

In evaluating the effectiveness of the addition agents of the present invention, electrophoretic tests were conducted on the aluminum suspension with and without the incorporation of the agents. The aluminum flakes were mixed into each of the collected organic media to provide a mixture containing about 0.1 to 20% by weight-volume of aluminum. The mixture was vigorously shaken before inserting the electrodes thereinto. Field strengths ranging between about 12 to 940 volts per centimeter of separation of electrodes were then applied for specified periods of time. In all cases, where no addition agents were employed, the deposits, if any were formed, were either very runny, non-uniform, had little cohesive strength, or were produced so slowly as to be unfeasible.

In accordance with the invention, additions of n-butylamine in concentrations of 0.02 to 10% by volume were found to yield good electrophoretic deposits of aluminum. Minor additions of suitable binders, such, for example, as rosin, gum benzoin and ethyl cellulose were effective to produce more cohesive deposits.

Although it is not intended that the invention be limited thereto, there is set forth hereinbelow for purposes of illustration, examples of values which may suitably be employed in practicing this invention:

| Organic Liquid | Preferred addition n-butyl-amine, vol. percent | Preferred wt. vol. percent of aluminum flake | Preferred volts/cm. separation of electrodes | Current Density, ma./cm.$^2$ | Deposition Rate, mm./min. | Remarks |
|---|---|---|---|---|---|---|
| Acetone | 0.2 | 4 | 100 | 0.15 | 1.1 | High Deposition Rate. |
| Chloroform | 0.2 | 4 | 300 | 0.01 | 0.66 | Cohesive deposit. |
| Methyl Acetate | 0.2 | 4 | 100 | 0.10 | 0.28 | High throwing power. |

It has been found that minor additions of other amines, such as isopropylamine, tributylamine, aniline, and α-naphthylamine, in proportions generally similar to the n-butylamine tabulated above, yield satisfactory electrophoretic deposits of aluminum when suspended in acetone.

From the foregoing description, it is apparent that the electrophoretic deposition of aluminum from selected non-aqueous suspending media has been provided by means of minor additions of commercially available organic solvents to such media, and wherein the aluminum is more uniformly, more rapidly, and more coherently deposited.

I claim:
1. A bath composition for electrophoretically depositing aluminum flake material and finely divided aluminum from non-aqueous suspensions thereof consisting of about 0.1 to 20% weight-volume of said aluminum dispersed in an organic solvent selected from the group consisting of acetone, chloroform and methyl acetate and a minor proportion of n-butylamine in the proportion of about 0.02 to 10% by volume of the entire suspension.
2. A bath composition for electrophoretically depositing aluminum flake material and finely divided aluminum from non-aqueous suspensions thereof consisting of about 0.1 to 20% weight-volume of said aluminum dispersed in an organic solvent selected from the group consisting of acetone, chloroform and methyl acetate and a minor proportion of an amine selected from the group consisting of isopropylamine, tributylamine, aniline and alpha naphthylamine in the proportion of about 0.02 to 10% by volume of the entire suspension.

3. The composition of claim 1 further characterized by said aluminum being of a particle size under 44 microns.

4. The composition of claim 1 wherein said aluminum comprises about 4% by weight-volume of the entire suspension and the n-butylamine comprises about 2% by volume of the entire suspension.

References Cited in the file of this patent

UNITED STATES PATENTS

| | | |
|---|---|---|
| 2,462,125 | Oakes | Feb. 22, 1949 |
| 2,530,366 | Gray | Nov. 21, 1950 |
| 2,530,546 | Snyder | Nov. 21, 1950 |
| 2,858,256 | Fahmoe | Oct. 28, 1958 |
| 2,966,449 | Bouchard | Dec. 27, 1960 |

OTHER REFERENCES

Blue et al.: The Electrochemical Society, Reprint 65–2, April 30, 1934, pages 25–38.

De Boer et al.: "Electrodeposition of a Thin Layer of Powdered Substances," Rec. Trav. Chim., volume 58, 1939, pages 662–5.

Wood et al.: Journal of the Electrochemical Society, January 1957, pages 29–36.